US011035304B2

(12) United States Patent
Burkhardt et al.

(10) Patent No.: US 11,035,304 B2
(45) Date of Patent: Jun. 15, 2021

(54) METHOD AND DEVICE FOR VALVE TRAVEL SWITCHING CONTROL OF AN INTERNAL COMBUSTION ENGINE

(71) Applicant: CPT Group GmbH, Hannover (DE)

(72) Inventors: Thomas Burkhardt, Neutraubling (DE); Jürgen Dingl, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/544,410

(22) Filed: Aug. 19, 2019

(65) Prior Publication Data

US 2019/0368433 A1 Dec. 5, 2019

Related U.S. Application Data

(63) Continuation of application No. PCT/EP2018/053570, filed on Feb. 13, 2018.

(30) Foreign Application Priority Data

Feb. 28, 2017 (DE) ..................... 10 2017 203 213.8

(51) Int. Cl.
*F02D 41/00* (2006.01)
*F02B 37/18* (2006.01)
(Continued)

(52) U.S. Cl.
CPC .......... *F02D 41/0007* (2013.01); *F02B 37/18* (2013.01); *F02D 13/0226* (2013.01);
(Continued)

(58) Field of Classification Search
CPC ............. F02D 2041/001; F02D 41/007; F02D 41/1406; F02D 2041/1433; F02D 13/0207;
(Continued)

(56) References Cited

U.S. PATENT DOCUMENTS 5,243,527 A    9/1993  Kroger
8,121,766 B2   2/2012  Heap et al.
(Continued)

FOREIGN PATENT DOCUMENTS

DE       10305646 A1     8/2004
DE    102010023636 A1    12/2011
(Continued)

OTHER PUBLICATIONS

International Search Report and Written Opinion dated May 7, 2018 from corresponding International Patent Application No. PCT/EP2018/053570.
(Continued)

*Primary Examiner* — Jesse S Bogue
*Assistant Examiner* — Loren C Edwards

(57) ABSTRACT

Embodiments of the present disclosure relate to a method and device for valve travel switching control of an internal combustion engine supercharged by an exhaust-gas turbocharger having a wastegate valve. This valve travel switching control includes: determining the current sensitivity of the charge pressure at a current operating point, at which a current valve travel, a current wastegate valve position and a current charge pressure are present, to changes in the wastegate valve position; determining the minimum valve travel necessary to set a desired operating point, taking into account the determined current sensitivity of the charge pressure; and switching the valve travel if the minimum valve travel necessary to set the internal combustion engine to an extended range with respect to the desired operating point differs from the current valve travel. By means of these measures, the fuel saving operating range of the internal combustion engine is enlarged.

14 Claims, 1 Drawing Sheet

(51) Int. Cl.
*F02D 13/02* (2006.01)
*F02D 41/14* (2006.01)

(52) U.S. Cl.
CPC .... *F02D 41/1401* (2013.01); *F02D 2041/001* (2013.01); *F02D 2041/1433* (2013.01); *F02D 2200/0402* (2013.01); *F02D 2200/0406* (2013.01); *F02D 2250/16* (2013.01)

(58) Field of Classification Search
CPC ............. F02D 13/0211; F02D 13/0226; F02D 13/023; F02D 2013/0296; F02D 13/0246; F02D 2200/0402; F02D 2200/0406; F02D 2250/16; F02B 37/18; F02B 37/183; F02B 37/186
See application file for complete search history.

(56) References Cited

U.S. PATENT DOCUMENTS

| | | | |
|---|---|---|---|
| 2006/0075996 A1 | 4/2006 | Yoshino et al. | |
| 2008/0190405 A1 | 8/2008 | Eser et al. | |
| 2013/0306026 A1* | 11/2013 | Tanaka | F02D 41/0002 123/347 |
| 2014/0034026 A1 | 2/2014 | Katsumata et al. | |
| 2017/0122223 A1 | 5/2017 | Kaisser et al. | |

FOREIGN PATENT DOCUMENTS

| | | |
|---|---|---|
| DE | 102010045710 A1 | 3/2012 |
| DE | 102012211527 A1 | 1/2014 |
| DE | 112013007151 T5 | 2/2016 |
| DE | 102015204155 B3 | 8/2016 |
| EP | 1736640 A2 | 12/2006 |
| EP | 2672093 A1 | 12/2013 |
| KR | 20060052082 A | 5/2006 |
| KR | 20060060713 A | 6/2006 |
| KR | 20170051334 A | 5/2017 |
| WO | 2012104998 A1 | 8/2012 |

OTHER PUBLICATIONS

German Office Action dated Sep. 27, 2017 for corresponding German Patent Application No. 10 2017 203 213.8.
Korean Office Action dated Jul. 1, 2020 for the counterpart Korean Patent Application No. 10-2019-7027349.

* cited by examiner

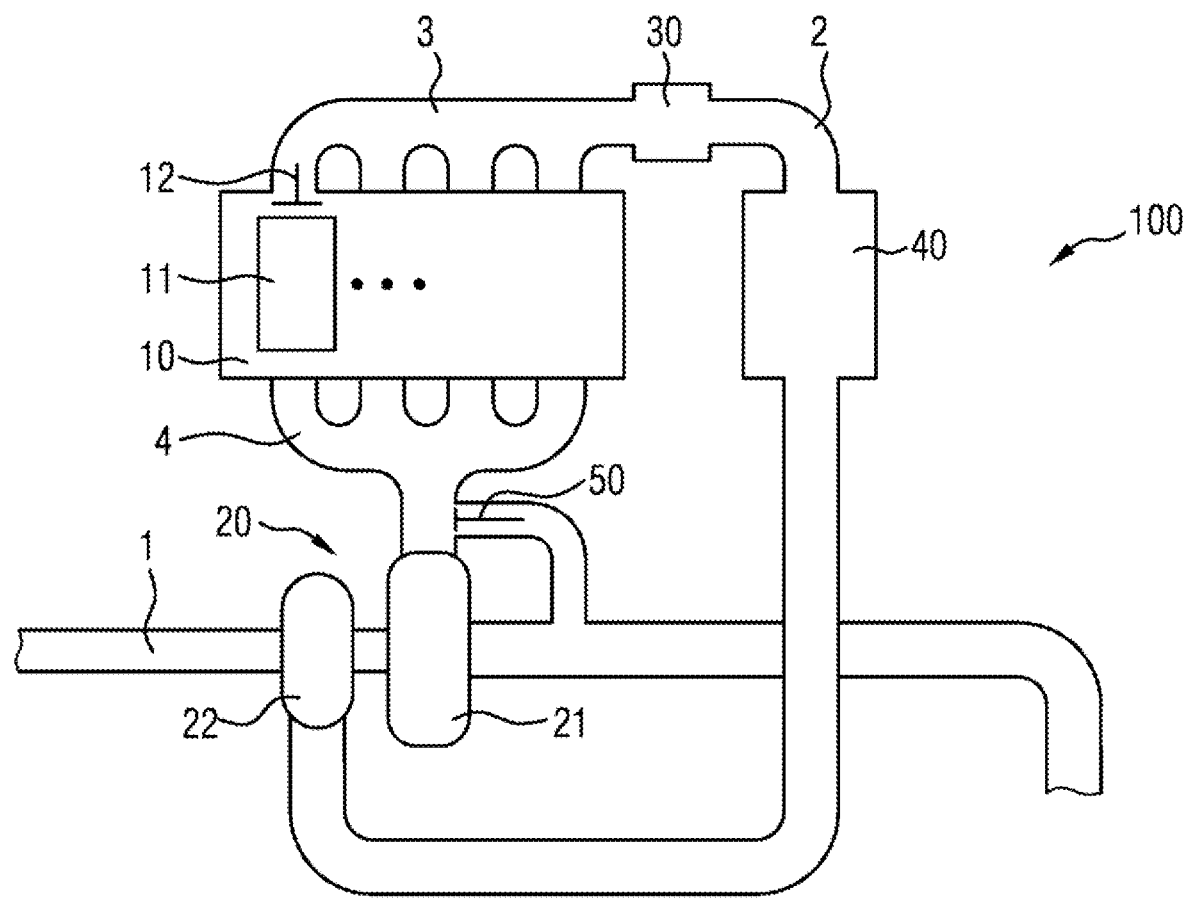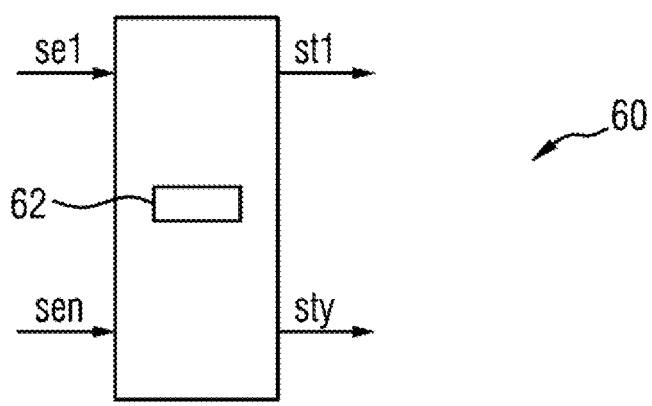

METHOD AND DEVICE FOR VALVE TRAVEL SWITCHING CONTROL OF AN INTERNAL COMBUSTION ENGINE

CROSS REFERENCE TO RELATED APPLICATIONS

This application is a continuation of International application No. PCT/EP2018/053570 filed Feb. 13, 2018, which claims priority to German patent application No. 10 2017 203 213.8, filed Feb. 28, 2017, each of which is hereby incorporated by reference herein.

FIELD OF INVENTION

The invention relates to a method and a device for valve travel switching control of an internal combustion engine.

BACKGROUND

Modern internal combustion engines are often fitted with turbochargers and increasingly with actuators for switching the valve travel in order to be able to harmonize high specific power with low specific fuel consumption. In this case, use is made of the fact that, in order to be able to achieve the same cylinder air mass when reducing the valve travel of the inlet valves, the absolute intake manifold pressure can be raised, reducing the volume flow via the inlet valves of the engine and hence the power dissipation of the engine. Here, "larger valve travel" refers to a configuration of the valve control in which the integral of the opening cross section of the controlled gas exchange valve over the crank angle during valve opening is greater than in the case of a different configuration referred to as "smaller valve travel".

Engines designed in this way should be operated as often and as long as possible at a valve travel with a small volume flow via the inlet valves for the sake of favorable fuel consumption. However, there is a limit above which the engine can supply the power demanded by the driver only with a full or next-largest valve travel. In addition to this physically determined limit, there can also be restrictions of the possible operating range due to rough running, noise, impairment of drivability etc.

Hitherto, the switching threshold to the full or next-largest valve travel has been determined by applicative measures in such a way that even engines with limiting components, e.g. an exhaust-gas turbocharger with a reduced efficiency, can reliably achieve a desired new operating point with a desired cylinder air mass.

SUMMARY

An object of the invention is to indicate an improved method for valve travel switching control of an internal combustion engine.

In the method for valve travel switching control of an internal combustion engine which is charged by an exhaust-gas turbocharger having a wastegate valve, the following steps are carried out:

determining the current sensitivity of the charge pressure at a current operating point with a current cylinder air mass, at which a current valve travel, a current wastegate valve position and a current charge pressure are present, to changes in the wastegate valve position, determining the minimum valve travel necessary to set a desired operating point with a desired cylinder air mass, taking into account the determined current sensitivity of the charge pressure, and switching the valve travel if the minimum valve travel necessary to set the desired operating point differs from the current valve travel.

The advantages of the invention consist especially in that it is possible to predict, by estimation of the charge pressure buildup, that is still possible in the specific engine under consideration at the current operating point with the current valve travel, whether a desired operating point may be achieved solely by changing the charge pressure or whether a switch to a modified valve travel is necessary or possible. It is thereby possible to extend the operating range of the specific engine under consideration with a small valve travel since it is not necessary to pay attention to limiting components when determining the switching thresholds. This corresponds to an extension of the fuel saving engine operating mode.

The method is suitable both for switching to a larger valve travel and for switching to a smaller valve travel.

In the case of a switch to a larger valve travel, estimation of the maximum charge pressure that is possible at the current operating point with the wastegate valve closed is performed, using the determined current sensitivity of the charge pressure, in order to determine the minimum valve travel necessary to set the desired operating point, and an increase in the valve travel is performed if the estimated maximum possible charge pressure is lower than the charge pressure required to set the desired operating point.

The current valve travel can be a partial travel or a zero travel, wherein the zero travel implements a cylinder shutdown.

The current position of the wastegate valve can be a fully open or partially open position of the wastegate valve.

The valve travel is switched to a valve travel which is larger than the current valve travel, e.g. to a full travel.

In the case of a switch to a smaller valve travel, estimation of the maximum charge pressure that is possible at the current operating point with this potential smaller valve travel with the wastegate valve fully closed is performed, using the determined current sensitivity of the charge pressure, in order to determine the minimum valve travel necessary to set the desired operating point, and a reduction in the valve travel is performed if the estimated maximum possible charge pressure is higher than the charge pressure required to set the desired operating point.

Here, the current valve travel may be a partial travel or a full travel.

The current position of the wastegate valve may be a partially or fully closed position of the wastegate valve.

The valve travel is switched to a valve travel which is smaller than the current valve travel, e.g. to a zero travel.

The determination of the current sensitivity of the charge pressure may be performed using a stored model.

BRIEF DESCRIPTION OF THE DRAWINGS

Further advantageous properties of the invention will become apparent from the illustrative explanation thereof given below with reference to FIG. 1, which shows a block diagram of a device for valve travel switching control of an internal combustion engine supercharged by an exhaust-gas turbocharger having a wastegate valve.

DETAILED DESCRIPTION

This device illustrated in FIG. 1 contains a drive train 100, which contains an internal combustion engine 10 supercharged by an exhaust-gas turbocharger 20. The internal combustion engine 10 has one or more cylinders 11, to each of which an inlet valve 12 is assigned. Each of these inlet valves has a plurality of valve travels, between which it may be switched.

The exhaust-gas turbocharger 20 comprises a turbine 21 and a compressor 22. The compressor 22 is connected on the inlet side to a fresh air duct 1 and makes available compressed fresh air on the outlet side. This air is supplied via a charge air cooler 40 to a charge air section 2 and, from there, is transferred to an intake manifold 3 via a throttle valve 30. From the intake manifold, the compressed air is transferred to the respective cylinder 11 via the respective inlet valve 12. There the fuel introduced into the cylinder is burnt with this fresh air.

The exhaust gases formed during this combustion process pass via an exhaust manifold 4 to the turbine 21 of the exhaust-gas turbocharger 20. There, they drive a turbine wheel, which is connected by a shaft to a compressor wheel, which is arranged in the compressor and is thus driven by the turbine wheel via said shaft.

Moreover, the device shown has a wastegate duct, which may be adjusted continuously between a fully open state and a closed state by means of a wastegate valve 50.

Furthermore, the device shown in FIG. 1 has an engine control device 60, which is designed to control the internal combustion engine 10 or a multiplicity of actuators of the internal combustion engine 10. This engine control device 60 is supplied with a multiplicity of sensor signals se1, ..., sen. Using these sensor signals, a stored operating program and additional data stored in a memory 62, the engine control device 60 determines control signals st1, ..., sty, which are provided for the control of said actuators of the internal combustion engine. The data stored in the memory 62 include the data of an air path model, which contains information on settings of the actuators associated with a multiplicity of air pressures. This information on actuator settings includes information on the different valve travels of the inlet valves 12 of the cylinders 11.

The engine control device 60 is designed to carry out a method for valve travel switching control of the internal combustion engine shown, which is supercharged by the exhaust-gas turbocharger having the wastegate valve 50.

To carry out this method, the engine control unit controls the performance of the following steps:

determining the current sensitivity of the charge pressure at a current operating point, at which a current valve travel, a current wastegate valve position and a current charge pressure are present, to changes in the wastegate valve position, determining the minimum valve travel necessary to set a desired operating point, taking into account the determined current sensitivity of the charge pressure, and switching the valve travel if the minimum valve travel necessary to set the desired operating point differs from the current valve travel.

According to a first embodiment of the invention, an increase in the valve travel is performed if the maximum charge pressure that may be achieved at the current operating point is not sufficient to set the desired operating point.

In this embodiment, to determine the minimum valve travel necessary to set the desired operating point, estimation of the maximum charge pressure that is possible at the current operating point with the wastegate valve closed is performed, using the determined current sensitivity of the charge pressure, and an increase in the valve travel is performed if the estimated maximum possible charge pressure is lower than the charge pressure required to set the desired operating point.

The current valve travel may be a partial travel or a zero travel, wherein the zero travel implements a cylinder shutdown.

The current position of the wastegate valve may be a fully open or partially open position of the wastegate valve.

In this embodiment, a switch of the valve travel to a valve travel which is larger than the current valve travel is performed if the maximum charge pressure that may be achieved at the current operating point is not sufficient to set the desired operating point.

If the current valve travel is a zero travel or a partial travel, for example, a switch of the valve travel to a full travel may be performed.

It is furthermore possible, if the current valve travel is a zero travel or a partial travel, for a switch of the valve travel to a larger partial travel to be performed if this larger partial travel is sufficient to set the desired operating point.

Exhaust-gas turbochargers which have a wastegate produce the maximum achievable charge pressure at a respectively present current operating point when the wastegate is closed. In this embodiment, therefore, a determination is made for the specific engine under consideration as to what charge pressure this specific engine may produce at the current operating point with the wastegate closed. This determination takes account of information on the specific operating behavior of the engine, including adaptation values and/or available measured values, e.g. for the turbocharger speed of the exhaust gas temperature.

Starting from the current operating point with the associated wastegate valve position and the associated charge pressure, the charge pressure with the wastegate closed is estimated, taking into account the current sensitivity of the charge pressure to changes in the wastegate valve position, using the following relation:

$$p_{max} = p_0 + dp/ds \cdot (s_{WG\_gesch1} - s_0).$$

Here, $p_{max}$ is the maximum achievable charge pressure at the current operating point, $p_0$ is the charge pressure at the current operating point, $dp/ds$ is the sensitivity of the charge pressure to changes in the wastegate valve position at the current operating point, $s_{WG\_gesch1}$ is the wastegate valve position in the closed state of the wastegate, and $s_0$ is the wastegate valve position at the current operating point.

The current sensitivity of the charge pressure to changes in the wastegate valve position may be determined using a charge pressure sensor, which is arranged in the charge air section 2. Said determination may be performed by incrementally closing the wastegate valve to a position s1, thereby causing an incrementally small rise in the charge pressure to a pressure p1. This rise in the charge pressure may be measured by means of the charge pressure sensor arranged in the charge air section 2 and may be used to determine the sensitivity of the charge pressure to changes in the wastegate valve position:

$$dp/ds = (p1 - p0)/(s1 - s0).$$

During this determination of sensitivity, the specific properties of the respective engine under consideration are taken into account. Since this incremental closure of the wastegate valve has an effect on the intake manifold pressure present in the intake manifold 3 and hence also on the cylinder filling, this pressure rise must be counteracted by suitable countermeasures, e.g. incremental closure of the throttle valve, in order to keep the cylinder air mass constant.

As an alternative, the current sensitivity of the charge pressure to changes in the wastegate valve position may also be determined using a model stored in the memory 62, in which the dependence of the charge pressure on the wastegate valve position is stored. If a model of this kind is available, the sensitivity of the charge pressure to changes in the wastegate valve position dp/ds may be determined with the aid of the functions for determining the setpoint wastegate valve position. In this process, in addition to the calculation of the current setpoint wastegate valve position s0 for a desired setpoint charge pressure p0, a determination is carried out in a second function call for a setpoint charge pressure p1 different from p0, of a setpoint wastegate valve position s1 which implements said setpoint charge pressure p1. By taking into account adaptation values learned thus far for the current operating point for the specific engine, the properties of the specific engine may be taken into account in this calculation.

In the embodiment described above, the engine control device may decide whether the specific internal combustion engine under consideration may set a determined desired cylinder air mass at the current valve travel or whether a switch to a larger valve travel is necessary. For this purpose, the engine control device determines whether the specific internal combustion engine under consideration may produce an absolute intake manifold pressure sufficient for the cylinder air mass corresponding to the desired operating point and may produce the charge pressure required for this purpose. If this is not the case, the engine control device must control the valve travel actuators of the inlet valves in such a way that there is an increase in the valve travel, e.g. to a full travel.

If this necessary switch of the valve travel does not take place promptly but only at a later point in time, this later switch may entail driving behavior which is not smooth.

According to a second embodiment of the invention, a reduction of the valve travel is performed if the maximum charge pressure that may be achieved at the potential smaller valve travel is larger than the charge pressure necessary to set the desired operating point.

In this embodiment, to determine the minimum valve travel necessary to set the desired operating point, estimation of the charge pressure that is possible at the potential smaller valve travel with the wastegate valve fully closed is performed, using the determined current sensitivity of the charge pressure, and a reduction of the valve travel is performed if the estimated maximum possible charge pressure is higher than the charge pressure required to set the desired operating point.

The current valve travel may be a partial travel or a full travel.

The current wastegate valve position may be a partially or fully closed position of the wastegate valve.

In this embodiment, a switch of the valve travel to a valve travel which is smaller than the current valve travel is performed if the maximum charge pressure that may be achieved at the potential smaller valve travel is higher than the charge pressure necessary to set the desired operating point.

If the current valve travel is a full travel or a partial travel, for example, a switch of the valve travel to a zero travel may be performed. The latter implements a cylinder shutdown.

It is furthermore possible, if the current valve travel is a full travel or a partial travel, for a switch of the valve travel to a smaller partial travel to be performed if this smaller partial travel is suitable for setting the desired operating point.

Exhaust-gas turbochargers which have a wastegate produce the maximum achievable charge pressure at a respectively present current operating point when the wastegate is fully closed. In this embodiment, therefore, a determination is made for the specific engine under consideration as to what charge pressure this specific engine may produce at the current operating point with the wastegate fully closed. This determination takes account of information on the specific operating behavior of the engine, including adaptation values and/or available measured values, e.g. for the turbocharger speed or the exhaust gas temperature.

Starting from the current operating point with the associated wastegate valve position and the associated charge pressure, the charge pressure with the wastegate fully closed is estimated, taking into account the current sensitivity of the charge pressure to changes in the wastegate valve position, using the following relation:

$$P_{max} = p_0 + dp/ds \cdot (s_{WG\_gesch1} - s_0).$$

Here, $p_{max}$ is the maximum achievable charge pressure at the current operating point, $p_0$ is the charge pressure at the current operating point, dp/ds is the sensitivity of the charge pressure to changes in the wastegate valve position at the current operating point, $s_{WG\_gesch1}$ is the wastegate valve position in the closed state of the wastegate, and $s_0$ is the wastegate valve position at the current operating point.

It is not possible, as in the embodiment described above, to determine the current sensitivity of the charge pressure to changes in the wastegate valve position using a charge pressure sensor which is arranged in the charge air section 2 because the potential smaller valve travel would actually have to be set for this purpose.

In this embodiment, the current sensitivity of the charge pressure to changes in the wastegate valve position must be determined using a model stored in the memory 62, in which the dependence of the charge pressure on the wastegate valve position is stored. If a model of this kind is available, the sensitivity of the charge pressure to changes in the wastegate valve position dp/ds may be determined with the aid of the functions for determining the setpoint wastegate valve position. In this process, in addition to the calculation of the current setpoint wastegate valve position s0 for a setpoint charge pressure p0, a determination is carried out in a second function call for a setpoint charge pressure p2 different from p0, of a setpoint wastegate valve position s2 which implements said setpoint charge pressure p2:

$$dp/ds = (p2 - p0)/(s2 - s0).$$

By taking into account adaptation values learned thus far for the current operating point for the specific engine, the properties of the specific engine may be taken into account in this calculation.

In the embodiment described above, the engine control device may decide whether a switch to a smaller valve travel is possible on the specific internal combustion engine under consideration. For this purpose, the engine control device estimates, at the current operating point and taking into account the potential smaller valve travel and the current sensitivity of the charge pressure to changes in the wastegate valve position, whether the maximum charge pressure that is possible at the potential smaller valve travel is higher than the charge pressure required to set the desired operating point at the potential smaller valve travel and performs a switch of the valve travel to a smaller valve travel if this is the case.

By means of this switch to a smaller valve travel, it is ensured in an advantageous manner that the operating range of the specific engine under consideration may be extended with a valve travel having a lower volume flow or even with deactivated valves since there is no need to take account of limiting components when determining the switching thresholds. It is thereby possible to extend the fuel saving operating range of the specific engine under consideration.

The invention claimed is:

1. A method for valve travel switching control of an internal combustion engine, which is supercharged by an exhaust-gas turbocharger having a wastegate valve, said method comprising:

determining a current sensitivity of a charge pressure at a current operating point of the internal combustion engine, at which a current valve travel, a current wastegate valve position and a current charge pressure are present, to changes in the wastegate valve position, estimating a maximum charge pressure that is possible at the current operating point with the wastegate valve closed, using the determined current sensitivity of the charge pressure, and increasing the valve travel when the estimated maximum possible charge pressure is lower than a charge pressure required to set a desired operating point of the internal combustion engine.

2. The method as claimed in claim 1, wherein the current valve travel is a partial travel or a zero travel.

3. The method as claimed in claim 2, wherein the increasing the valve travel comprises switching to a full travel.

4. The method as claimed in claim 1, wherein the current wastegate valve position is a fully or partially open position of the wastegate valve.

5. The method as claimed in claim 1, wherein the maximum charge pressure possible at the current operating point with the wastegate valve closed is estimated using the following relation:

$$P_{max} = p_0 + dp/ds \cdot (s_{WG\_gesch1} - s_0),$$

wherein $p_{max}$ is a maximum achievable charge pressure at the current operating point, $p_0$ is the charge pressure at the current operating point, $dp/ds$ is the sensitivity of the charge pressure to the changes in the wastegate valve position at the current operating point, $s_{WG\_gesch1}$ is the wastegate valve position in a closed state of the wastegate valve, and $s_0$ is the wastegate valve position at the current operating point.

6. The method as claimed in claim 1, wherein the determining the current sensitivity of the charge pressure comprises using a stored model.

7. A method for valve travel switching control of an internal combustion engine, which is supercharged by an exhaust-gas turbocharger having a wastegate valve, said method comprising:

determining a current sensitivity of a charge pressure at a current operating point of the internal combustion engine, at which a current valve travel, a current wastegate valve position and a current charge pressure are present, to changes in the wastegate valve position, estimating a maximum charge pressure that is possible at a potential smaller valve travel with the wastegate valve fully closed, using the determined sensitivity of the charge pressure, and switching the valve travel when the estimated maximum possible charge pressure is higher than a charge pressure required to set a desired operating point of the internal combustion engine.

8. The method as claimed in claim 7, wherein the current valve travel is a partial travel or a full travel.

9. The method as claimed in claim 8, wherein the switching the valve travel switches to a valve travel which is smaller than the current valve travel.

10. The method as claimed in claim 8, wherein the switching the valve travel comprises switching to a zero travel.

11. The method as claimed in claim 7, wherein the current position of the wastegate valve is a partially or fully closed position of the wastegate valve.

12. The method as claimed in claim 7, wherein the estimating the maximum charge pressure possible at the potential smaller valve travel with the waste gate valve fully closed comprises using the following relation:

$$P_{max} = p_0 + dp/ds \cdot (s_{WG\_gesch1} - s_0),$$

wherein $p_{max}$ is the maximum achievable charge pressure at the current operating point, $p_0$ is the charge pressure at the current operating point, $dp/ds$ is the sensitivity of the charge pressure to the changes in the wastegate valve position at the current operating point, $s_{WG\_gesch1}$ is the wastegate valve position in a closed state of the wastegate valve, and $s_0$ is the wastegate valve position at the current operating point.

13. A device for valve travel switching control of an internal combustion engine which is supercharged by an exhaust-gas turbocharger having a wastegate valve, the device comprising:

an engine control device which is configured for determining a current sensitivity of a charge pressure at a current operating point of the internal combustion engine, at which a current valve travel, a current wastegate valve position and a current charge pressure are present, to changes in the wastegate valve position, estimating a first maximum charge pressure that is possible at the current operating point with the wastegate valve closed, using the determined current sensitivity of the charge pressure, increasing the valve travel when the first estimated maximum possible charge pressure is lower than a charge pressure required to set a desired operating point of the internal combustion engine, estimating a second maximum charge pressure that is possible at a potential smaller valve travel with the wastegate valve fully closed, using the determined current sensitivity of the charge pressure, and switching the valve travel when the second estimated maximum possible charge pressure is higher than the charge pressure required to set the desired operating point.

14. The device of claim 13, wherein the determining the current sensitivity of the charge pressure comprises using a stored model.

* * * * *